United States Patent
Yokota et al.

(10) Patent No.: US 7,715,687 B2
(45) Date of Patent: May 11, 2010

(54) SYSTEM AND METHOD OF RECORDING AND RECORDING APPARATUS

(75) Inventors: Teppei Yokota, Chiba (JP); Michiaki Yoneda, Kanagawa (JP)

(73) Assignee: Sony Corporation (JP)

( * ) Notice: Subject to any disclaimer, the term of this patent is extended or adjusted under 35 U.S.C. 154(b) by 1069 days.

(21) Appl. No.: 11/187,433

(22) Filed: Jul. 22, 2005

(65) Prior Publication Data
US 2006/0024027 A1 Feb. 2, 2006

(30) Foreign Application Priority Data
Jul. 30, 2004 (JP) .............. P2004-222916

(51) Int. Cl.
*G06F 13/00* (2006.01)
*H04N 7/26* (2006.01)

(52) U.S. Cl. .............. 386/83; 386/46; 386/124; 725/40; 725/50; 725/58

(58) Field of Classification Search .............. 386/46, 386/69, 70, 83, 95, 124–126; 725/40, 50, 725/55, 58, 89, 133, 134, 141, 142, 153; 348/460, 474, 569, 570, 725, 731, 906; 369/32, 369/33, 47, 48, 32.01, 47.12
See application file for complete search history.

(56) References Cited

U.S. PATENT DOCUMENTS

| | | | |
|---|---|---|---|
| 6,219,312 B1 * | 4/2001 | Hirata | 369/30.27 |
| 6,344,878 B1 * | 2/2002 | Emura | 348/460 |
| 7,343,085 B2 * | 3/2008 | Hasegawa | 386/95 |
| 7,398,542 B2 * | 7/2008 | Yamamura et al. | 725/55 |
| 2002/0184638 A1 * | 12/2002 | Agnihotri et al. | 725/89 |
| 2005/0152678 A1 * | 7/2005 | Sugai et al. | 386/83 |
| 2006/0078299 A1 * | 4/2006 | Hasegawa | 386/83 |

FOREIGN PATENT DOCUMENTS

| | | |
|---|---|---|
| JP | 2004-023326 A | 1/2004 |
| JP | 2004-179993 A | 6/2004 |

* cited by examiner

*Primary Examiner*—Thai Tran
*Assistant Examiner*—Mishawn Dunn
(74) *Attorney, Agent, or Firm*—Lerner, David, Littenberg, Krumholz & Mentlik, LLP

(57) ABSTRACT

A recording system having a plurality of recording apparatuses connected to a network. The apparatuses can select a channel for receiving a broadcast signal and record reservations for recording a program broadcast through a broadcasting channel at a predetermined time of day. One of the apparatuses, denoted as a reservation-receiving recording apparatus, receives recording reservation information from a user and detects if there is any overlapping programs in time using received recording reservation information and prexisting recording reservation information stored in memory. The reservation-receiving recording apparatus sends to the network a recording reservation request including overlapping recording reservation information, if it detects broadcasting time period overlaps, wherein the overlapping recording reservation information causes the overlapping program to be recorded by another recording apparatus connected to the network instead.

7 Claims, 10 Drawing Sheets

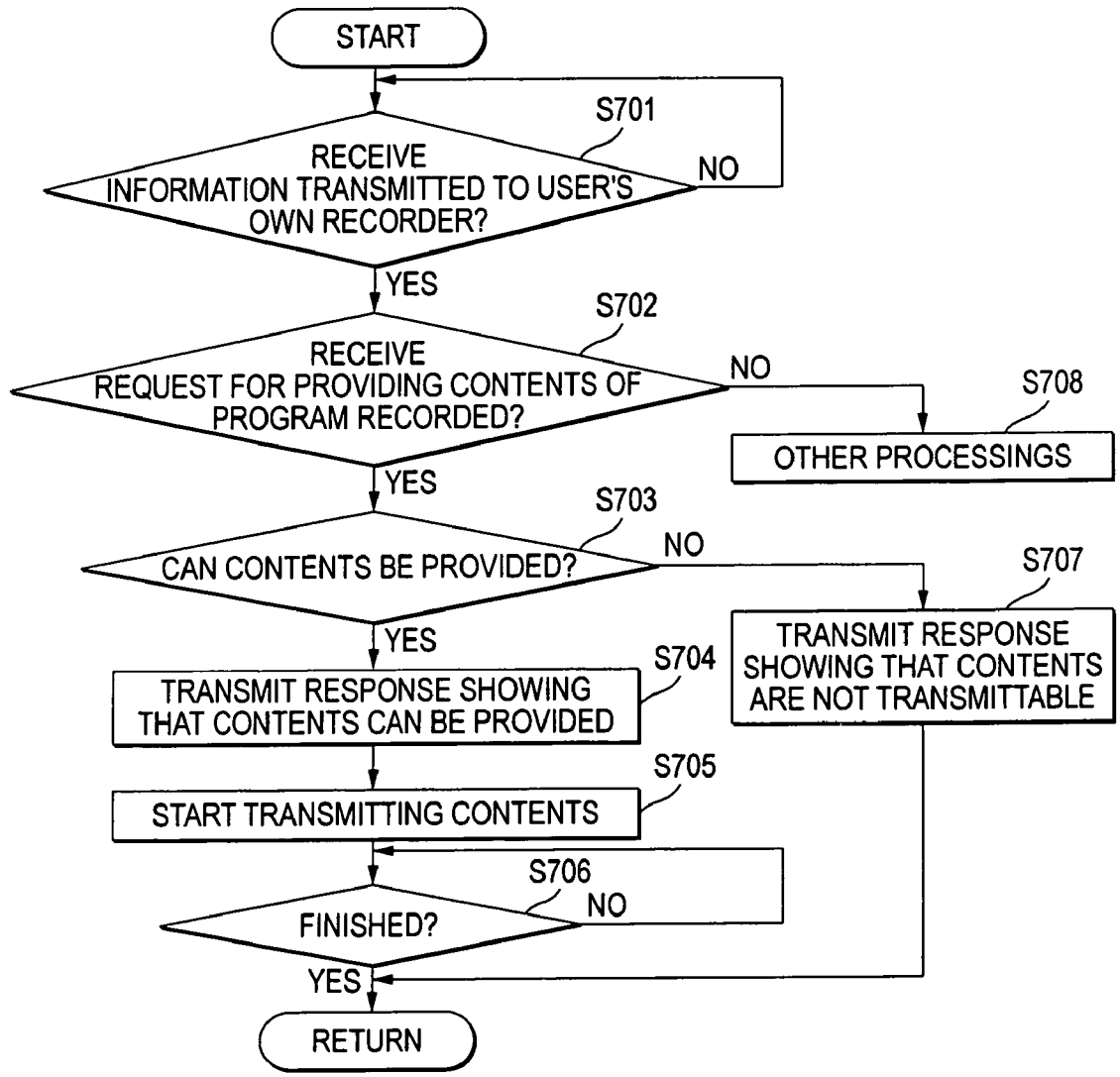

SYSTEM AND METHOD OF RECORDING AND RECORDING APPARATUS

CROSS-REFERENCE TO RELATED APPLICATIONS

The present invention claims priority from Japanese Patent Application JP 2004-222916 filed on Jul. 30, 2004, the disclosure of which is hereby incorporated by reference herein.

BACKGROUND OF THE INVENTION

The present invention relates to a recording system including recording apparatuses, for example, such as a DVD (Digital Versatile Disk) recorder and a hard disk and a recording method and a recording apparatus which are used in the system.

There is a growing use of recording apparatuses having a complex of a DVD recorder and a HDD (Hard Disk Drive), for example, and even network connection terminals such as Ethernet (registered trademark) terminals in place of video tape recorders. Many of these recording apparatuses are designed to allow easy program recording reservations through a GUI (Graphical User Interface) that enables sorting on the base of a broadcasting channel or program genre while displaying electronic program information such as via an EPG (Electronic Program Guide) on the display screen of a television set (monitor receiver).

However, most recording apparatuses have only one TV (television) tuner mounted. Although these recording apparatuses allow making easy program recording reservations, it can be considerably problematic where a user wants to record a program televised on different channels at the same time of the day. If two programs that the user wants to record are televised at the same time of the day as described above, the user would have to give up recording one of the two programs.

However, there will be cases where programs are already recorded through the EPG, for example, where programs recording reservations made in the past, for example yesterday or the day before yesterday, and a program recording reservation made now are for the same time of the day. In these cases, it can be difficult for the user to correctly understand and remember the existence of any two program recording reservations by date, time of the day, channel or program name. Deciding which of two programs having reservations should be prioritized would require many steps, thus preventing the available convenient EPG from being fully used.

Considering the above-mentioned situation, Japanese Patent Application 2004-023326, described later, proposes technologies in which a recording apparatus (system) includes a plurality of personal computers connected to an IP (Internet protocol) network and are provided with a tuner function, each of which, as a server apparatus, manages the existence of a tuner function, operating conditions, and program recording reservations for individual personal computers connected to the same network.

In this case, the function of the server apparatus then operates as described below if there are two TV program recording processings on a personal computer connected to a relevant network or there is an insufficient empty capacity in a hard disk for recording the TV program. Namely, the function of the server apparatus asks an available other computer connected to the same network to record an intended TV program to prevent the recording of what is called a counter program and the suspension of program recording due to an insufficient storage capacity.

For the recording apparatus described in the above-mentioned Japanese Patent Application 2004-023326, however, a plurality of personal computers would need to be connected to the same network. A server apparatus for managing individual personal computers would also invariably need to be provided, thus resulting in an uneconomical, large-sized recording apparatus.

However, DVD players and disk players will become more and more popular from now on. There is therefore a need for the realization of a system that will allow more flexible TV program recordings, such as allowing easily and inexpensively simultaneous recording of different TV programs broadcast through different TV channels at same time of the day using DVD players and hard disk recorders instead of multi-functional and high-performance information processing apparatuses such as personal computers.

In addition, oftentimes two or more recording units are connected to record TV programs. However, it would be desirable to be able to easily and correctly manage which recording unit is used and which TV program is recorded. As with the technologies described in the above-mentioned patent literature, recording units used and TV programs recorded could be managed in detail by providing a server apparatus for management use. It is desirable, however, to be able to simply and accurately mange recording histories without providing such a server apparatus for exclusive management use.

Considering the situation mentioned above, it is desirable to provide a system, method, and apparatus for allowing more flexible TV program recording and easy and accurate program recording management by connecting a plurality of recordings apparatuses, each of which is often used as a single unit, to a network.

SUMMARY OF THE INVENTION

According to a first embodiment of the present invention, there is provided a recording system having a plurality of recording apparatuses connected to a network, the plurality of apparatuses comprising:

a function for selecting a channel for receiving a broadcasting signal; and a recording reservation function for recording, in individual recording media, program information defining a broadcast program broadcast through an intended broadcasting channel at a predetermined time of day;

wherein the plurality of apparatuses includes a reservation-receiving recording apparatus comprising reception means for receiving recording reservation information from a user, a memory for storing the recording reservation information received through the reception means, detection means for detecting any overlapping portion of a broadcasting time period using the recording reservation information received through the reception means and the recording reservation information stored in the memory, and delivery means for forming and delivering to the network a recording reservation request including overlapping recording reservation information if the detection means detects at least an portion of the broadcasting time period overlaps; and wherein the plurality of apparatuses further includes a reservation-making recording apparatus comprising a memory for holding recording reservation information, reception means for receiving information transmitted through the network, determination means for checking the recording reservation information in the memory and determining whether the information received through the reception means is receivable if the information received through the reception means is a recording reservation request by the reservation-receiving recording apparatus, reservation request reception means for storing in the memory recording reservation information responsive to the recording reservation request if the determination means determines that the recording reservation is receivable, and reservation recording control means for controlling a recording of program information defining a broadcast program provided by broadcasting in the recording medium in response to the recording reservation information stored in the memory through the reservation request reception means.

In a recording system according to the first embodiment of the present invention, one of a plurality of recording systems connected to the same network, as a reservation-receiving recording apparatus, receives recording reservation information including at least a broadcasting time period and a broadcasting channel directly from a user. If there is at least an overlapping portion of the broadcasting time period, the reservation-receiving recording apparatus selects as a reservation-making recording apparatus another recording apparatus connected to the same network and capable of receiving the recording reservation information that has resulted in an overlap at the reservation-receiving recording apparatus. The reservation-receiving recording apparatus then transmits the recording reservation information to the reservation-making recording apparatus for broadcast program recording on behalf of the reservation-receiving recording apparatus.

The above-mentioned procedure ensures that both of the two entire broadcast programs in the same broadcasting time period may be recorded in recording media and utilized without troublesome operations such as modifying, changing, and deleting recording reservation information already inputted. In other words, the procedure makes it possible to define a recording apparatus having a plurality of functions for reception and channel selection. The procedure also makes it possible to try to use less active recording apparatuses connected to the same network more effectively. Thus, broadcast programs may be recorded in a more flexible way and systems may be configured to allow easy and accurate recording management.

In a recording system of the present invention, according to a second embodiment, the reservation-receiving recording apparatus includes reception means for receiving program information defining broadcast program transmitted through the network, and recording processing means for recording program information defining the broadcast program received through the reception means in the recording medium of a user's own recording apparatus. The reservation-making recording apparatus includes program information transmission means for transmitting the program information defining the broadcast program recorded in the recording medium to a recording apparatus providing the recording reservation information, in response to control by the reservation recording control means, if recording in the user's own apparatus program information defining a broadcast program by means of a broadcasting signal for reception and channel selection comes to an end.

In a recording system according to the second embodiment of the present invention, the reservation-making recording apparatus records a broadcast program (program information such as video data and audio data which constitutes a broadcast program) transmitted from the reservation-receiving recording apparatus. In this case, the program information is transmitted from the reservation-making recording apparatus to the reservation-receiving recording apparatus directly after the end of the recording so that the program information may be uniquely utilized in the reservation-receiving recording apparatus.

Therefore, the user of the reservation-receiving recording apparatus will not be conscious of other recording apparatuses at all. Even if there is a broadcast program recording reservation overlap on the user's own recording apparatus, an intended broadcast program will be recorded on another recording apparatus connected to the same network, thus allowing the user to utilize the program information recorded on another recording apparatus.

In a recording system of the present invention, according to a third embodiment, the reservation-receiving recording apparatus includes provision request transmission means for transmitting a provision request for program information defining recorded broadcast program to a reservation-making unit that has performed recording in response to a recording reservation request through the network, and reception means for receiving program information defining broadcast program transmitted to a user's own recording apparatus through the network. The reservation-making recording apparatus includes program information transmission means for transmitting program information defining the broadcast program recorded in the recording medium to a recording apparatus proving the recording reservation information if a provision request for program information defining a broadcast program is received through the reception means.

In a recording system according to the third embodiment of the present invention, the reservation-making recording apparatus records a broadcast program (program information such as video data and audio data which constitutes a broadcast program) transmitted from the reservation-receiving recording apparatus in response to a recording reservation information. The reservation-making recording apparatus is also configured to be capable of providing the recorded program information to the reservation-receiving recording apparatus in response to a provision request made by the reservation-receiving recording apparatus.

Thus, the user of the reservation-receiving recording apparatus will be, if necessary, provided with the program information recorded on its behalf by the reservation-making recording apparatus so that the recorded program information may be used. This makes it possible to try to make effect use of the recording medium of each recording apparatus connected to the network.

In accordance with the present invention, individual recording apparatuses are connected to a network, thereby making it possible to configure a recording apparatus virtually having as many channels as recording apparatuses. It is therefore possible to configure a recording apparatus that will allow flexible cost- and energy-effective recording processing. Moreover, efforts may therefore be made to make effective use of any recording apparatus not in use.

BRIEF DESCRIPTION OF THE DRAWINGS

FIG. 10 is a flow chart for describing processing for providing a television program to a recording-requesting hard disk recorder.

DETAILED DESCRIPTION

A system, method and apparatus according to an embodiment of the present invention will be described below with reference to the drawings. In an embodiment of the present invention, a system, method, and apparatus according to an embodiment of the present invention will be described taking as an example a so-called home network system formed at home.

(Home Network System)

Figure 1:
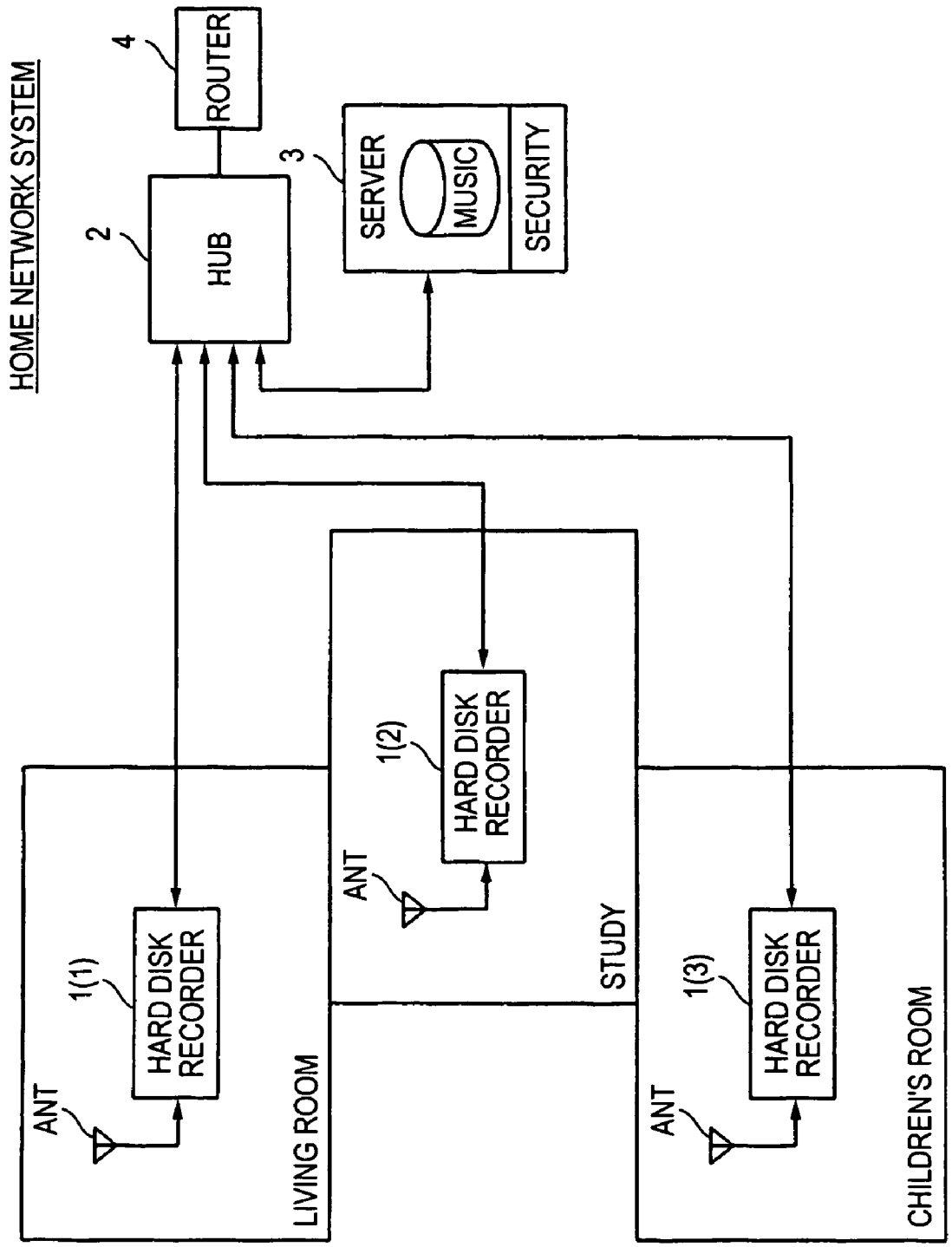
FIG. 1 is a diagram for describing a home network system of a system according to an embodiment of the present invention.

FIG. 1 is a diagram of a so-called home network system formed at home to which a system, method, and apparatus according to the embodiment of the present invention can be applied. As shown in FIG. 1, in the home network system according to this embodiment, recording apparatuses (program recording apparatuses) equipped with a television broadcast reception function, namely, hard disk recorders 1(1), 1(2), and 1(3), are provided in three rooms in the house, in this example, a living room, a study, and a children's room, respectively.

In this case, the hard disk recorder 1(1) provided in the living room serves common use among family members. The hard disk recorders 1(2) and 1(3) are provided for specific individual family members because of different interest and tastes about broadcast programs and different uses. More and more often, hard disk recorders dedicated to individual family members are provided even in one family, as described above.

Each of these hard disk recorders 1(1), 1(2), and 1(3) is also connected to a hub (marked HUB in FIG. 1) 2 so that they may communicate with one another through the hub. In this way, for example, the home network system according to the embodiment of the present invention can constitute an Ethernet (registered trademark) LAN (Local Area Network) system.

The hub 2 also has a server apparatus 3 connected thereto. The server apparatus 3 includes a large-capacity recording medium such as a hard disk. The large-capacity medium may store and hold contents such as TV broadcast programs and music and provide requested contents in response to a request from a client apparatus, for example, such as a hard disk recorder and a personal computer located in each room. The server apparatus 3 can also have a so-called security function such as collecting information from each unit connected to a LAN and detecting whether there is any failure or not based on the information collected.

In addition, each unit connected to the LAN may exchange information with external units, for example, such as personal computers connected to the Internet, through the hub 2 and a router 4. For the simplicity of the description, however, only the functions and operation of the home network system in a closed area such as a house will be described below.

Each of the hard disk recorders 1(1), 1(2), and 1(3) is also designed to be able to update its own firmware through the LAN.

(An Example of Hard Disk Recorders Configuration)

Figure 2:
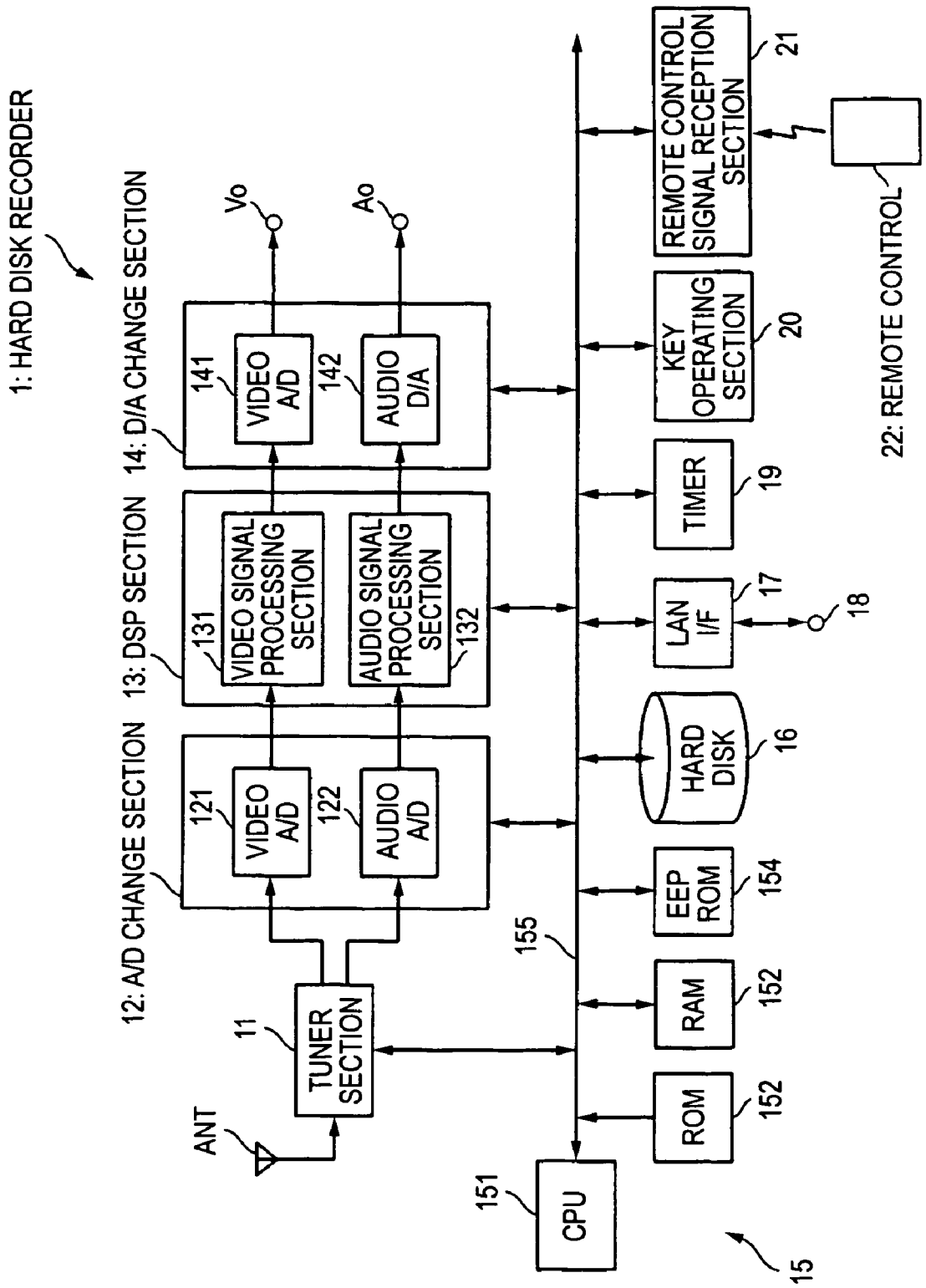
FIG. 2 is a diagram for describing a hard disk recorder of a recording apparatus according to an embodiment of the present invention.

FIG. 2 is a block diagram for describing an example of the configuration of the hard disk recorders 1(1), 1(2), and 1(3) used in the home network system according to the embodiment of the present invention. In this embodiment, each of the hard disk recorders 1(1), 1(2), and 1(3) has the same configuration. Therefore, the configuration of the hard disk recorder will be described considering each of the hard disk recorders 1(1), 1(2), and 1(3) as a hard disk recorders 1.

The hard disk recorders 1 used in this embodiment is one which apparatuses according to an embodiment of the present invention are applied to. As shown in FIG. 2, The hard disk recorders 1 includes a television broadcast reception antenna (hereinafter simply referred to as a reception antenna) ANT, a tuner section 11, an A/D (Analog/Digital) conversion section 12, DSP (Digital Signal Processor) section 13, a D/A (Digital/Analog) conversion section 14, a control section 15, a hard disk 16, a LAN interface (hereinafter referred to as LAN I/F) 17, a LAN connection terminal 18, a timer circuit (hereinafter simply referred to as a timer) 19, a keyoperation section 20, and a remote control signal reception section 21.

As shown in FIG. 2, the A/D conversion section 12 includes a video A/D section 121 and an audio A/D section 122. The DSP section 13 includes a video signal processing section 131 and an audio signal processing section 132. The D/A conversion section 14 also includes a video D/A section 141 and an audio D/A section 142.

The control section 15 is a microcomputer configured, as shown in FIG. 2, to have a CPU (Central Processing Unit) 151, a ROM (Read Only Memory) 152, a RAM (Random Access Memory) 153, and an EEPROM (Electrically Erasable and Programmable ROM) 154 connected thereto through a CPU bus 155 and to control each of the hard disk recorders 1 according to this embodiment.

The ROM 152 has stored various data necessary to various programs and processings performed by the CPU 151. The RAM 153 is used mainly as a job area, such as to temporarily store results of ongoing processings. The EEPROM 154 is a non-volatile memory and stores information, for example, such as executable programs and various setting parameters even if the hard disk recorder 1 is turned off.

The hard disk 16 may have a large capacity of a few hundred gigabytes or so, for example. The LAN I/F 17 and the LAN connection terminal 18 allow connection to a LAN compatible with a specified standard such as Ethernet (registered trademark). In addition, the timer (a clock circuit) 19 may provide accurate time information such as the present date, the present day of the week, and the present time.

The key operation section 20 includes an ON/OFF key for the power supply, up, down, right, and left allow keys, a recording key, a play key, a quick reverse key, a fast-forward key, a temporary stop key, a stop key, and various other functional keys. The key operation section 20 may receive inputs from the user's operation and form and transmit electric signals responsive to depressed operational keys to the control section 15.

The hard disk recorder 1 also includes remote control signal reception section 21. The remote control signal reception section 21 may receive, for example, an infrared remote control signal (remote control operational signal) delivered from a remote commander (hereinafter referred to as a remote control) 22 of the hard disk recorder 1, convert the signal into an electric signal, and transmit the electric signal to the control section 15.

Note that the remote control 22, like the key operational section 20, includes an ON/OFF key for the power supply, up, down, right, and left allow keys, a recording key, a play key, a quick reverse key, a fast-forward key, a temporary stop key, a stop key, and various other functional keys. The remote control 22 receives inputs from the user's operation and forms and delivers remote control signals responsive to depressed operational keys.

Various broadcasting signals received through the reception antenna ANT are fed to the tuner section 11. The tuner section 11 receives an intended broadcasting signal and selects a channel in response to a channel selection control signal fed from the control section 15. The channel selection control signal is formed in the control section 15 in response to a channel selection direction input from the user received through the key operation section 20.

The tuner section 11 then decodes the received and selected broadcasting signal to obtain an analog video signal (composite signal) and an analog audio signal before feeding these signals to the A/D conversion section 12. In this case, the analog video signal from the tuner section 11 is fed to the audio A/D section 122 of the A/D conversion section 12 and the analog audio signal from the tuner section 11 is fed to the audio A/D section 122 of the A/D conversion section 12.

In this embodiment, the video A/D section 121 separates the analog video signal fed thereto into a luminance signal and a carrier chrominance signal, converts these signals into digital signals, and forms and feed a digital video signal (digital component video data) to the video signal processing section 131 of the DSP section 13 through processings such as chroma decoding. The audio A/D section 122 also converts an audio signal fed thereto into a digital signal to form a digital audio signal before feeding the digital audio signal to the audio signal processing section 132 of the DSP section 13.

The video signal processing section 131 of the DSP section 13 feeds the digital video signal fed from the video A/D section 121 to the video D/A section 141 of the D/A conversion section 14. The video signal processing section 131 also performs data compression on the digital video signal fed from the video A/D section 121 by means of a predetermined compression method before feeding the digital video signal that has undergone the data compression processing to the control section 15.

In addition, the audio signal processing section 132 of the DSP section 13 feeds the digital audio signal fed from the audio A/D section 122 to the audio D/A section 142 of the D/A conversion section 14. The audio signal processing section 132 also performs data compression on the digital audio signal fed from the audio A/D section 122 by means of a predetermined compression method before feeding the digital audio signal that has undergone the data compression processing to the control section 15.

In this case, the control section 15 receives the digital video signal and digital audio signal fed from the DSP section 13 which have undergone data compression. The control section 15 then performs processing such as multiplexing these signals to form recording data TS (Transport Stream) and stores the recording data in the hard disk 16.

On the other hand, the video D/A section 141 of the D/A conversion section 14 converts the digital video signal fed thereto into an analog video signal and outputs the analog video signal through a video output terminal Vo. The audio D/A section 142 of the D/A conversion section 14 also converts the digital audio signal fed thereto into the analog audio signal and outputs the analog audio signal through the audio output terminal Ao.

The analog video signal outputted from the video output terminal Vo and the analog audio signal outputted from the audio output terminal Ao are fed to, for example, a TV set (monitor receiver). This causes an image responsive to the video signal from hard disk recorder 1 to be displayed on the display screen of the display terminal of the TV set. It also causes sound responsive to the audio signal from the hard disk recorder 1 to be emitted through the speakers of the TV set.

The control section 15 also receives directions for playing contents recorded in the hard disk 16 from the user through the key operation section 20 or the remote control 22 and the remote control signal reception section 21. In this case, the control section 15 reads intended contents from the hard disk 16, separates the contents into a digital video signal and a digital audio signal. The control section 15 then feeds the digital video signal and the digital audio signal to the video signal processing section 131 of the DSP section 13 and the audio signal processing section 132, respectively.

In this case, the video signal processing section 131 of the DSP section 13 decompresses the compressed digital video signal that was fed from the control section 15 to obtain an original digital video signal. The video signal processing section 131 then feeds the original digital video signal to the video D/A section 141 of the D/A conversion section 14. Similarly, the audio signal processing section 132 of the DSP section 13 decompresses the compressed digital audio signal that was fed from the control section 15 to obtain an original digital audio signal. The video signal processing section 131 then feeds the original digital audio signal to the audio D/A section 142 of the D/A conversion section 14.

As described above, the video D/A section 141 of the D/A conversion section 14 converts the digital video signal fed thereto into a analog video signal and outputs the analog video signal through the video output terminal Vo. The audio D/A section 142 of the D/A conversion section 14 also converts the digital audio signal fed thereto into a analog audio signal and outputs the analog audio signal through the audio output terminal Ao.

This causes the analog video signal outputted from the video output terminal Vo and the analog audio signal outputted from the audio output terminal Ao to be fed to a TV set, for example. This permits an image responsive to the video signal from the hard disk recorder 1 to be displayed on the display screen of the display terminal of the TV set. It also permits sound responsive to the audio signal fed from hard disk recorder 1 to be emitted from the speakers of the TV set.

In this way, the hard disk recorder 1 may receive a television broadcasting signal, select a channel, record an intended televised program in the hard disk 16, and play the televised program record in the hard disk 16 for viewing.

As shown in FIG. 2, the hard disk recorder 1, according to this embodiment, also includes a timer 19 so that a program recording reservation (recording reservation) may be made. The hard disk recorder 1 may receive and utilize electronic program table information, known as an EPG (Electrical Program Guide), which is provided through broadcast, or through the Internet, to which the hard disk recorder 1 is connectable through a router 4, and through a LAN to which the hard disk recorders 1(1), 1(2), and 1(3) according to this embodiment are connected.

The EPG information is stored and held in the EEPROM 154 and the hard disk 16, for example. An EPG for display is then formed in the control section 15 and fed to a subsequent television set through the video signal processing section 131 of the DSP section 13, the video D/A section 141 of the D/A conversion section 14, and the video output terminal Vo so that the EPG is displayed on the display screen of the display terminal of the television set.

The user then can select an intended program through the EPT displayed on the display screen of the television set so that a program recording reservation may be easily made. In this case, the cursor on the EPG displayed may be moved by operating arrow-moving keys such as the arrow keys on the key operation section 20 so that an intended broadcast program may be selected. In this case, the cursor is displayed through the control section 15, the DSP section 13, and the D/A conversion section 14. Program recording reservations thus made through the ESP are stored and held, for example, in a predetermined area in the EEPROM 154 and the hard disk 16 so that these program recording reservations may be listed for checking purposes, and can be changed and deleted.

If, however, program recording reservations are made using the EPG, there is often a broadcasting time period overlap where a program recording reservation may be made for a broadcast program shown on a different channel. For example, in the morning, a program recording reservation may be made for an 8:00 p.m.-10:00 p.m. channel 8 (8 ch) program on the hard disk recorder 1(1) using a reservation system of a type that displays a simple and convenient program table using an EPG, as mentioned above. Some time later, in the afternoon, a next program recording reservation may be made for a 9:00 p.m.-11:00 p.m. program channel 10 (10 ch) program. At this point, a program recording time overlap warning will appear.

As shown in FIG. 2, each of the hard disk recorders 1(1), 1(2), and 1(3) includes only one tuner section 11 and broadcast programs on different channels may not be selected and recorded at the same time. In the above-mentioned case, the user would have to leave the program recording reservation processing using the EPG, return to the display of a program recording reservation list to check program recording reservation details (situations) and again decide which of the two programs should be prioritized for recording.

If, as described above, two program recording reservations had been made for broadcast programs shown at different channels in the same time period which would not be recordable simultaneously, these program recording reservations would have involve troublesome and time-consuming corrections, as mentioned above. In addition, a program recording reservation could have been made for only one of the two televised programs.

If, therefore, there is a program recording reservation that faces a broadcasting time period overlap at a different channel in any one of the hard disk recorders 1(1), 1(2) and 1(3), as described above, in the home network system according to this embodiment of the present invention, the next step takes place. Any one of the hard disk recorders 1(1), 1(2), and 1(3) permits an available one of the other disk recorders to make a program recording for the time period for which the recording reservation is made. Note that program recording reservation information (recording reservation information) received through the EPG as described above contains information showing each of at least the date of broadcasting, a broadcasting time period, and a broadcasting channel and is stored and held, for example in the EEPROM 154 of the hard disk recorder for management.

Figure 3:
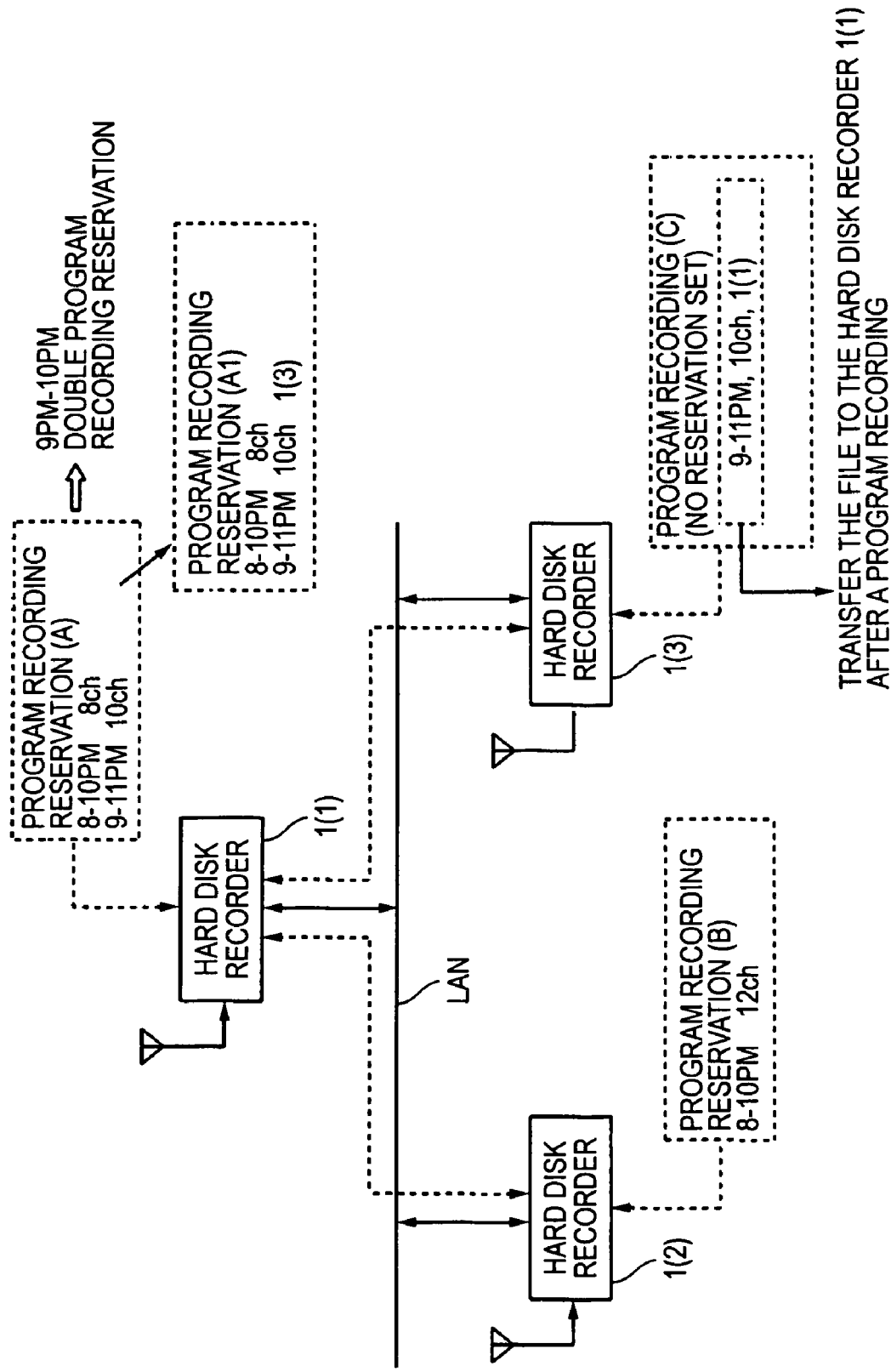
FIG. 3 is a diagram for describing broadcast program recording reservation processing performed in the home network system shown in FIG. 1.

FIG. 3 is a diagram for describing a program recording reservation processing for a broadcast program performed in the home network system according to this embodiment. Naturally, program recording reservations may also be made for later days, for example, for tomorrow, for three days later, and for a week later, and so forth. For the simplicity of the description, program recording reservations for one day will be described below.

As shown in FIG. 3, assume that a program recording reservation is made on the hard disk recorder 1(1) for a 8:00 p.m.-10:00 p.m. channel 8 (8 ch) program and then for a 9:00 p.m.-11:00 p.m. channel 10 (10 ch) program, as shown for program recording reservation (A). In this case, there is a program recording reservation overlap at the different channels for a one-hour period between 9:00 p.m. and 10:00 p.m.

The control section 15 of the hard disk recorder 1(1) may detect such a program recording reservation overlap relatively easily and accurately by comparing the program recording reservation information now inputted with program recording reservation information already inputted. After detecting such a program recording reservation overlap, the control section 15 of the hard disk recorder 1(1) makes an inquiry to the other hard disk recorders 1(2) and 1(3) on the LAN. The control section 15 inquires about whether or not to be able to receive the second program recording reservation information (program recording reservation information about the 9:00 p.m.-11:00 p.m. channel 10 (10 ch) program) and make a recording reservation) via the LAN.

For the example shown in FIG. 3, the hard disk recorder 1(2), like the hard disk recorder 1(1), already has a prior program recording reservation (program recording reservation information about the 8:00 p.m.-10:00 p.m. channel 12 (12 ch) program). Therefore, the hard disk recorder 1(2) returns to the hard disk recorder 1(1) a notification that the second program recording reservation could not be received.

In this case, the hard disk recorder 1(1) passes on the hard disk recorder 1(2) because of the returned notification that the second program recording reservation could not be received. The hard disk recorder 1(1) then makes an inquiry to the next hard disk recorder 1(3).

Here, the hard disk recorder 1(3) has no program recording reservations for the same time period and notifies the hard disk recorder 1(1) that the program recording reservation from the hard disk recorder 1(1) is receivable. As shown in program recording reservation (C) for the hard disk recorder 1(3) in FIG. 3, the hard disk recorder 1(3) then receives the program recording reservation from the hard disk recorder 1(1) to record the 9:00 p.m.-11:00 p.m. channel 10 (10 ch) televised program.

It is noted that the program recording reservation that the hard disk recorder 1(3) received from the hard disk recorder 1(1) did not originate in the user's own recording apparatus but rather originated in the hard disk recorder 1(1). As shown in the program recording reservation (C) in FIG. 3, information showing that the program recording reservation was received from another recorder and information showing that another recorder is the hard disk recorder 1(1) (the number 1(1) in this example) are therefore added to show that the program recording reservation was received from the hard disk recorder 1(1).

The hard disk recorder 1(1) may also receive the program recording reservation for the 9:00 p.m.-11:00 p.m. channel 10 (10 ch) television program as it is. As shown in the program recording reservation (A1) for the hard disk recorder 1(1) in FIG. 3, however, information showing a recorder to which the program recording reservation was transferred (number 1(3)) is added to the program recording reservation information. This is done so as to understand the program recording reservation for the 9:00 p.m.-11:00 p.m. channel 10 (10 ch) television program will be made by the hard disk recorder 1(3) instead.

At the program recording reservation time period, the hard disk recorder 1(3) then performs the recording of the broadcast program televised through the broadcasting channel 10, based on the program recording reservation information (about the 9:00 p.m.-11:00 p.m. channel 10 (10 ch) program) that the hard disk recorder 1(3) received from the hard disk recorder 1(1).

When finishing a recording processing based on the recording reservation information at 11:00 p.m., the hard disk recorder 1(3) transfers the recorded program information (such as program-constituting video and audio data) as a file to the commanding hard disk recorder 1(1) via the LAN.

The hard disk recorder 1(3) can then operate (for move processing) to erase its corresponding file. In such a case, the move processing does not create a copy and is also effective from the viewpoint of copyright. For contents that do not require the move-processing operation, the hard disk recorder 1(3) may also be configured to only transfer (copy) the recorded program information.

Although a program recording reservation time period overlap has been described above as an example for the hard disk recorder 1(1), the hard disk recorders 1(2) and 1(3) can also transfer program recording reservation information so that reserved program recording can be performed on their behalf.

A hard disk recorder that receives reservation information directly from a user and issues a program recording reservation command as described above is hereinafter called a reservation-receiving hard disk recorder, as required, for differentiation purposes. A hard disk recorder is also called a reservation-making hard disk recorder, which receives program recording reservation information from a reservation-receiving hard disk recorder and records a reserved television program on its behalf.

(Processing Performed by Hard Disk Recorder)

Various processings about program recording reservations performed by hard disk recorders 1(1), 1(2), and 1(3) of the home network system according to this embodiment will be described below with reference to the accompanying flow charts. The operation of the hard disk recorder 1, as a representative of the hard disk recorders 1(1), 1(2), and 1(3) will be described below as well.

(Program Recording Reservation Reception Processing)

Figure 4:
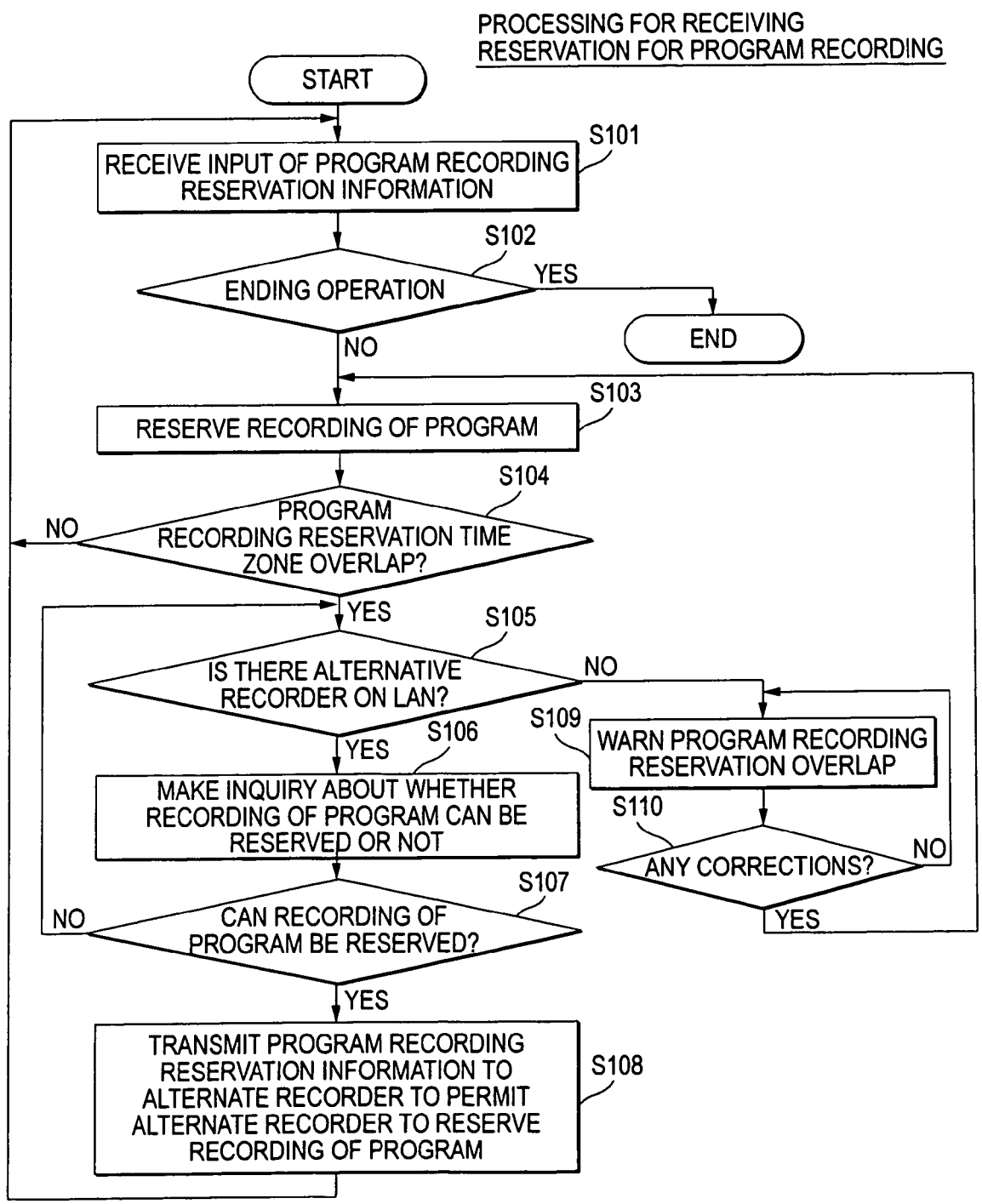
FIG. 4 is a flow chart for describing processing for receiving a program recording reservation.

Program recording reservation reception processing performed by the hard disk recorder 1 will be described first. FIG. 4 is a flow chart for describing program recording reservation reception processing performed by the hard disk recorder 1. The processing shown in FIG. 4 is performed by selecting Program Recording Reservation from the function selection menu, for example.

When the processing shown in FIG. 4 is performed, control section 15 of the hard disk recorder 1 displays an EPG responsive to EPG data that a user's own recording apparatus holds on the display screen of a television set connected to the user's own recording apparatus and receives an selection input for a television program on which a program recording reservation will be made (step S101). In other words, the processing at step S101 is performed to receive the input of program recording reservation information from the user.

At step S101, the control section 15 then determines whether end operation for program recording reservation processing has been received at step S101 instead of a selection input for an intended television program (step S102). When determining, at determination step S102, that the end operation has been received, the control section 15 ends the processing shown in FIG. 4. When determining that the end operation has not yet been received, the control section 15 sets a program recording reservation responsive to the received selection input for a television program (step S103).

The control section 15 then determines whether there is an overlap in a broadcasting time period (time period subject to a program recording reservation) for the television program subject to the recording reservation between the program recording reservation information newly set at step S103 and the program recording reservation information already set (step S104). In other words, the determination processing at step S104 is performed to determine whether there is any partial overlap between the program recording time shown by the program recording reservation information newly inputted and the program recording time shown by the program recording reservation information already inputted. When determining in the determination processing at S104, that there is no program recording reservation time period overlap, the control section 15 repeats the process starting at Step S101 to repeat program recording reservation reception.

When determining, in the determination processing at Step S104, that there is a program recording reservation time period overlap, the control section 15 determines whether other recorders (hard disk recorders) existon the LAN to which the user's own recording apparatus is connected (step S105). The determination processing at step S105 involves, for example, delivering a response request on the LAN, recognizing a hard disk recorder that responds to the request as a recorder connected to the LAN, and holding information of identifying the recognized recorder. It is possible to make a judgement based on the information.

Note that the determination processing at step S105 may involve delivering a response request on the LAN as required and recognizing a responding hard disk recorder as a recorder connected to the LAN. A recognized hard disk recorder may also be registered as a recorder on the LAN in the EEPROM 154 for individual hard disk recorders, for example, to allow a later judgment about whether there are recorders other than the user's own recording apparatus, based on information contained in the EEPROM 154.

When determining, in the determination processing at step S105, that other recorders exist on the LAN, the control section 15 makes an inquiry to one of the other recorders about whether it is possible to make the program recording reservation for which the user's own recording apparatus faces a program recording reservation time period overlap in response to new program recording reservation information (step S106). The control section 15 then confirms response information from another responding recorder and determines whether or not the program recording reservation is possible (step S107).

When in the determination processing at step S107 the response information from another responding recorder shows that the program recording reservation is not possible, the control section 15 repeats the processing starting at step S105 to determine whether another recorder exists on the LAN. If another recorder exists on the LAN, the control section 15 will make an inquiry to the recorder about whether a program recording reservation is possible.

When, in the determination processing at step S107, determining, from the response returned by the responding recorder, that a program recording reservation may be made in response to the program recording reservation information newly received at step S101, the control section 15 performs the next step. The control section 15 transmits program recording reservation information to be received at step S101 to the hard disk recorder which acts as another recorder capable of a program recording reservation and makes the program recording reservation to another recorder (step S108). The control section 15 then repeats the processing starting at step S101 to repeatedly receive program recording reservation information inputs.

Note that when determining, in the determination processing at step S105, that no other recorders or no more recorders exist on the LAN, the control section 15 issues a notification warning about a program recording reservation time period overlap (step S109). The control section 15 then determines whether corrections to the program recording reservation information have been received (step S110).

When determining, in the determination processing at step S110, that no corrections to the program recording reservation information have been received, the control section 15 repeats the processing starting at step S109 and, when determining that a correction to the program recording reservation information has been received, repeats the processing starting at step S103 and checks for a program recording reservation time period overlap.

As described above, each of hard disk recorders 1(1), 1(2), and 1(3), which are recorders constituting the home network system according to this embodiment, is configured to make a newly received program recording reservation to an available one of the other hard disk recorders existing on the same LAN if there is a program recording reservation time period overlap.

(Processing for Receiving Information Transmitted to the User's Own Recording Apparatus)

Figure 5:
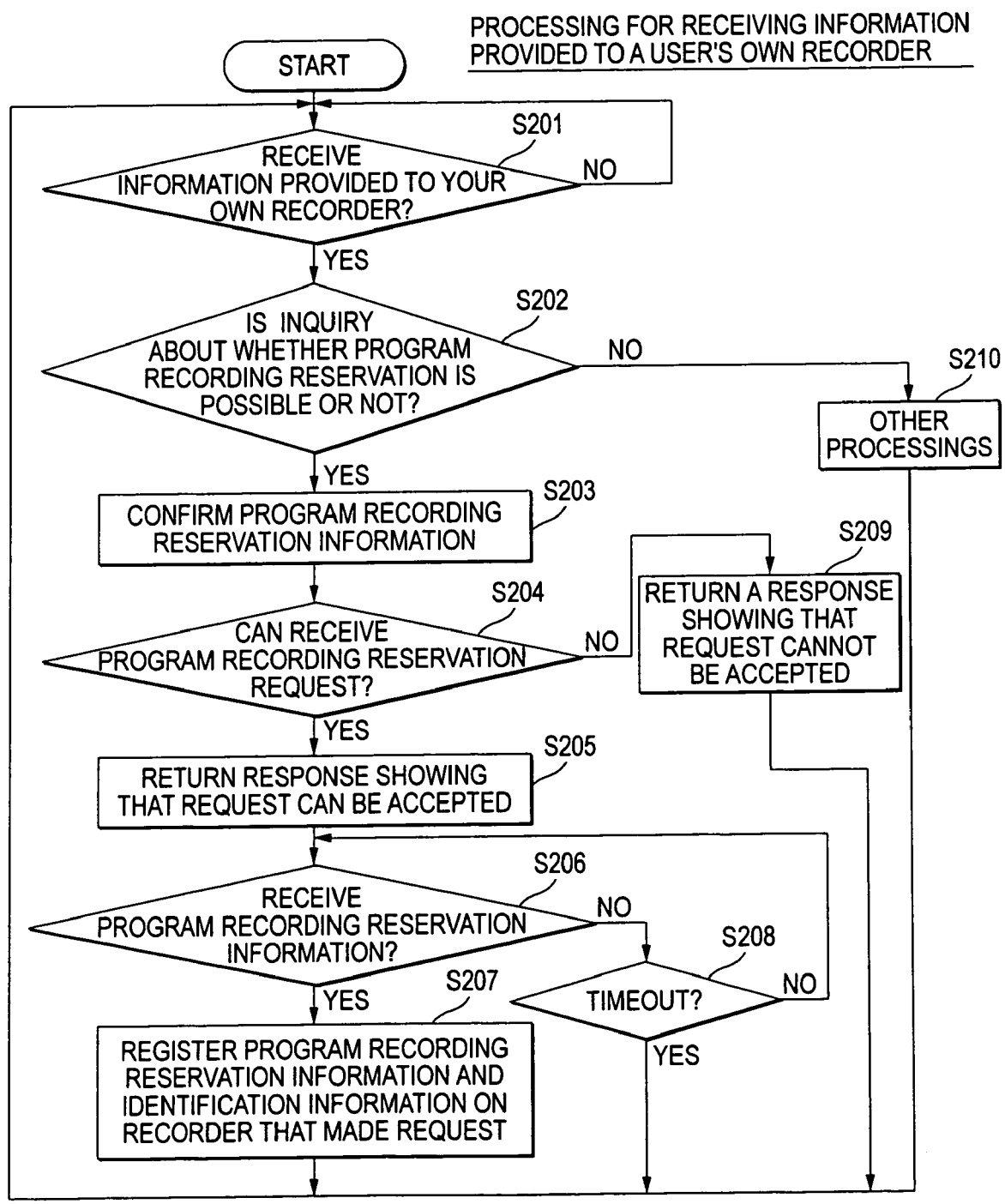
FIG. 5 is a flow chart for describing processing for receiving information transmitted to a user's own recording apparatus.

A processing for receiving information such as program recording reservation information transmitted to the user's own recording apparatus via the LAN will be described below. FIG. 5 is a flow chart for describing a processing performed by hard disk recorder 1 for receiving information transmitted to the user's own recording apparatus. The processing shown in FIG. 5 is performed by each of the hard disk recorders 1 if it is possible to receive information transmitted through the LAN.

When the processing shown in FIG. 5 is performed, the control section 15 of the hard disk recorder 1 waits for information transmitted to the user's own recording apparatus through the LAN to which the user's own recording apparatus is connected (step S201). When determining, at step S201, that information transmitted to the user's own recording apparatus has been received, the control section 15 determines whether the received information transmitted to the user's own recording apparatus is an inquiry about a program recording reservation (step S202).

When determining, in the determination processing at step S202, that the received information transmitted to the user's own recording apparatus is an inquiry about a program recording reservation, the control section 15 checks program recording reservation information stored and held in the EEPROM 154 of the user's own recording apparatus (step S203). The control section 15 then determines whether program recording reservation is possible, based on the received inquiry information about whether program recording reservation from other recorders is possible and on program recording reservation information stored and held in the EEPROM 154 of the user's own recording apparatus (step S204).

When determining, in the determination processing at step S204, that the reception of a program recording reservation is possible, the control section 15 forms a response to that effect and returns the response to a hard disk recorder that inquires about whether a program recording reservation is possible, through the LAN I/F 17 and the connection terminal 18 (step S205).

The control section 15 then waits for program recording reservation information transmitted from the hard disk recorder that inquires about whether a program recording reservation is possible (step S206). When determining, in the determination processing at step S206, that program recording reservation information has been received, the control section 15 registered the program recording reservation information and identification information for a requesting hard disk recorder in the EEPROM 154, for example (step S207). The control section 15 repeats the processing starting at Step S201.

When determining, in the determination processing at step S206, that no program recording reservation information has been received, the control section 15 also determines whether a predetermined time has passed since the response that the reception is possible was returned (step S208). When determining that the predetermined time has not passed, the control section 15 repeats the processing starting at step S206. When determining that the predetermined time has passed, the control section 15 determines that no program recording reservation information will be transmitted and repeats the processing starting at step S201.

When determining, in the determination processing at step S204, that no program recording reservations can be received because there is already a program recording reservation for the same time period, the control section 15 forms a response to that effect and returns the response to a hard disk recorder that inquires about whether a program recording reservation is possible (step S209) The control section 15 repeats the processing starting at step S201.

When determining, in the determination processing at step S202, that the received information transmitted to the user's own recording apparatus is not an inquiry about whether a program recording reservation is possible, control section 15 also performs other processings responsive to the received information transmitted to the user's own recording apparatus (step S210). The control section 15 then repeats the processing starting at step S201. If, as an example of a processing performed at step S210, the received information transmitted to the user's own recording apparatus is a content provision request, for example, the control section 15 reads out contents so requested from the hard disk 16 and transmits the contents to the requesting hard disk recorder through the LAN I/F 17, the connection terminal 18, and the LAN.

As described above, the hard disk recorder 1 according to this embodiment may receive information transmitted to the user's own recording apparatus transmitted through the LAN. If a program recording reservation from another recorder is possible, the hard disk recorder 1 receives program recording reservation from another recorder so that a program recording may be made on behalf of another recorder.

(Processing for a Hard Disk Recorder that Receives a Program Recording Reservation from Another Recorder)

Figure 6:
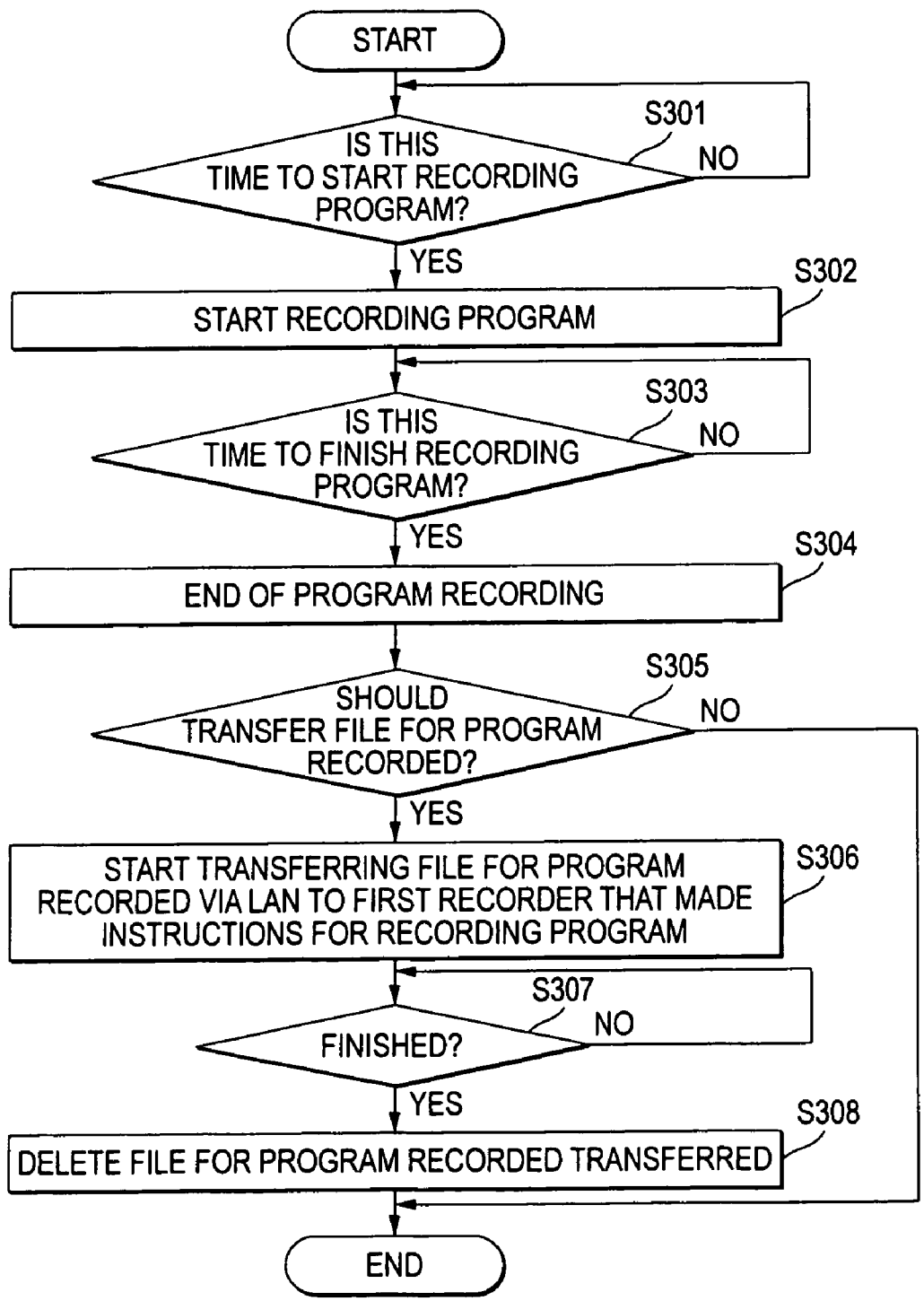
FIG. 6 is a flowchart for describing program recording based on a program recording reservation.

Program recording processing based on a program recording reservation performed by the hard disk recorder 1 according to this embodiment will be described below in terms of program recording reservation information inputted directly from the user and received from another recorder through the processing shown in FIG. 5. FIG. 6 is a flow chart for describing program recording processing based on a program recording reservation performed by the hard disk recorder 1. The processing shown in FIG. 6 does not include playback processing performed by the hard disk recorder 1 but is performed if the hard disk recorder 1 is ready for program recording processing.

When ready for program recording processing, the control section 15 and the like of the hard disk recorder 1 compares program recording start time contained in program recording reservation information stored and held in its own EEPROM 154 and the like with the current time provided by the timer 19 and determines whether this is the program recording start time for a television program subjected to a program recording reservation (step S301).

When determining, in the determination processing at step S301, that this is not the program recording start time, the control section 15 repeats the processing at S301 and waits until the program recording start time. When determining, in the determination processing at step S301, that this is the program recording start time for the television program subjected to a program recording reservation, the control section 15 controls each part of the hard disk recorder 1 according to the program recording reservation information and starts recording the television program subjected to a program recording reservation (step S302).

The control section 15 then compares program recording end time contained in program recording reservation information stored and held in its own EEPROM 154 and the like with the current time provided by the timer 19 and determines whether this is the program recording end time for the television program subjected to the program recording reservation (step S303).

When determining, in the determination processing at step S303, that this is not the program recording start time, the control section 15 repeats the processing at step S303 while continuing the program recording processing and waits until the program recording end time. When determining, in the determination processing at step S303, that this is the program recording start time for the television program subjected to the program recording reservation, the control section 15 controls each part of the hard disk recorder and ends ongoing television program recording (step S304).

The control section 15 then determines whether the television program being through with the program recording processing is contents to be transferred (step S305). Specifically, the control section 15 determines whether the television program is contents recorded in response to the program recording reservation information from another recorder or contents recorded in response to program recording reservation information received by the user's own recording apparatus from the user, based on program recording reservation information about the content.

If the program recording reservation information about the contents recorded according to the program recording reservation contains identification information on another requesting hard disk recorder, the control section 15 then determines that the contents recorded at this session is to be transferred to the requesting hard disk recorder and transmits the contents to the hard disk recorder requesting the program recording reservation through the LAN (step S306).

After the start of content transfer, the control section 15 waits until the end of the transfer of the entire contents (step S307). After the end of the transfer of the entire contents, the control section 15 controls each part of the hard disk recorder, deletes a file for the transferred contents from the hard disk 16 of the user's own recording apparatus (step S308), and ends the processing shown in FIG. 6. If, in addition, the reservation information about the contents recorded according to the program recording reservation does not contain the identification information about another requesting hard disk recorder, the control section 15 determines that the contents recorded need not be transferred and ends the processing shown in FIG. 6.

As described above, another recorder may record a television program on behalf of another recorder based on program recording reservation information from another recorder. If, in addition, another recorder records contents based on program recording reservation information, another recorder transfers the recorded contents to the requesting hard disk recorder and the recorded contents is deleted from the hard disk of the hard disk recorder that recorded the program.

This allows another recorder that transferred program recording reservation information to obtain a result similar to one that another recorder would obtain when actually recording the program. For a contents (television program) which was unrecordable because of a broadcasting time period overlap, another recorder may also obtain a result similar to one that another recorder would obtain when deciding to record an intended television program, that is, the same result as another recorder obtained when recording an intended television program. In addition, each of two or more television programs that face at least a broadcasting time period overlap may generally be recorded in its entirety.

(Processing for a Reservation-receiving Hard Disk Recorder Receiving the Provision of Recorded Contents)

Figure 7:
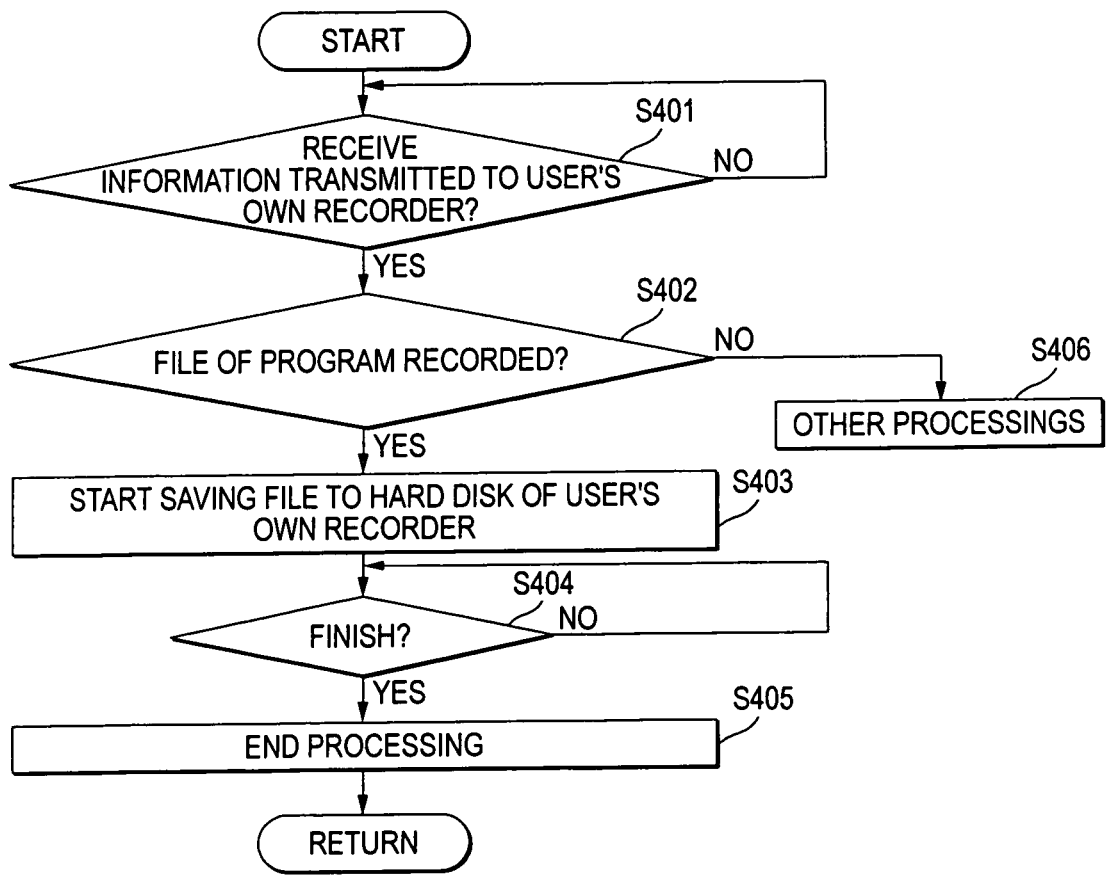
FIG. 7 is a flow chart for describing processing for a hard disk recorder of the reservation-receiving recording apparatus.

A description will be given below of processing for a reservation-receiving hard disk recorder that receives the provision of a television program recorded by reservation-making hard disk recorder in response to a request from the user's own recording apparatus. FIG. 7 is a flow chart for describing processing for a reservation-receiving hard disk recorder 1 that makes a program recording reservation to another recorder and receives the provision of television program data from another recorder.

A hard disk recorder that made a program recording reservation to another recorder through the recording reservation reception processing shown in FIG. 4 performs information provision receiving processing shown in FIG. 7. The hard disk recorder then determines whether information transmitted to the user's own recording apparatus has been received through the LAN to which the user's own recording apparatus is connected (step S401). When determining that no information transmitted to the user's own recording apparatus has been received, the hard disk recorder then repeats the processing at step S401. In other words, the hard disk recorder waits until information transmitted to the users own recording apparatus is received.

When determining, in the determination processing at step S401, the information transmitted to the users own recording apparatus has been received, the hard disk recorder determines whether the received information is television program data (recorded-program file) from the reservation-making hard disk recorder (step S402). The determination processing at step S402 may involve determining whether the received information is television program data from the reservation-making hard disk recorder, based on information shown the type of information contained in the header information in the received information that was transmitted to the users own recording apparatus, information showing transmitting recorders and the like, as well as program recording reservation information as shown in (A1) in FIG. 3 held by the user's own recording apparatus.

When determining, in the determination processing at step S402, that the received information is television program data (recorded-program file) from the reservation-making hard disk recorder, the hard disk recorder starts saving the television program data in the hard disk 16 of the user's own recording apparatus (step S403). The hard disk recorder then determines whether the saving of the television program data in the hard disk is over (step S404). When determining that the saving is not over, the hard disk recorder repeats the processing at step S404 and waits until the end of the saving of the television program.

When determining, in the determination processing at step S404, that the saving of the television program data provided from reservation-making hard disk recorder is over, the hard disk recorder performs end processing such as closing the corresponding file in the hard disk 16 (step S405) to end the processing shown in FIG. 7. When determining, in the determination processing at step S402, that the received information that was transmitted to the users own recording apparatus is not television program data from the reservation-making hard disk recorder, other processings are performed in response to the received information (step S406)

This allows the reservation-receiving hard disk recorder 1 to let another hard disk recorder connected to the same LAN perform program recording processing instead without actually performing program recording processing in the user's own recording apparatus. It also enables the reservation-receiving hard disk recorder 1 to obtain and save television program data from another hard disk recorder in the hard disk 16 of the user's own recording apparatus for unrestricted use.

As described above, hard disk recorder 1 according to this embodiment can transfer a program recording reservation to another hard disk recorder connected to the LAN and let another hard disk recorder record a program on its half, if there is an program recording reservation overlap in the user's own recording apparatus. This therefore allows a program recording reservation to be made for a television program provided through a different broadcasting channel during the same time period.

The television program data recorded instead by another reservation-making hard disk recorder is, after program recording, transferred to the reservation-receiving hard disk recorder so that the data is stored and held. The television program data is then deleted from the hard disk 16 of another reservation-making hard disk recorder. Therefore, the same data is stored and held in two locations, in the reservation-receiving hard disk recorder and another reservation-requesting hard disk recorder, thereby resulting in no wasteful use of the storage area of the hard disk.

(Other Examples of Processing Performed by the Hard Disk Recorder)

For processing performed by the hard disk recorder described with reference to FIGS. 4 to 7, the reservation-making hard disk recorder eventually transfers television program data recorded instead to the reservation-receiving hard disk recorder so that the reservation-receiving hard disk recorder may store and hold the data. The television program data is then deleted from the reservation-making hard disk recorder.

In some cases, however, the user may want to leave the television program data recorded instead in the reservation-making hard disk recorder. The user sometimes wants to do so if, for example, the hard disk of the reservation-receiving hard disk recorder has a small remaining storage capacity while the hard disk of the reservation-making hard disk recorder has a large storage capacity.

In this case, the following processings are performed as described above: the recording reservation reception processing, described with reference to FIG. 4 and the processing for receiving information transmitted to the user's own recording apparatus, described with reference to FIG. 5. The former processing is performed by the reservation-receiving hard disk recorder while the latter processing is performed by the reservation-making hard disk recorder. However, the following processing may also be performed as described below: (1) television program recording processing performed instead, (2) processing for requesting the provision of a television program obtained from the program recording processing performed instead and (3) processing for providing a television program obtained from the program recording processing performed instead. These individual processings will be described below.

(Other Examples of Television Program Recording Processing Performed Instead)

Figure 8:
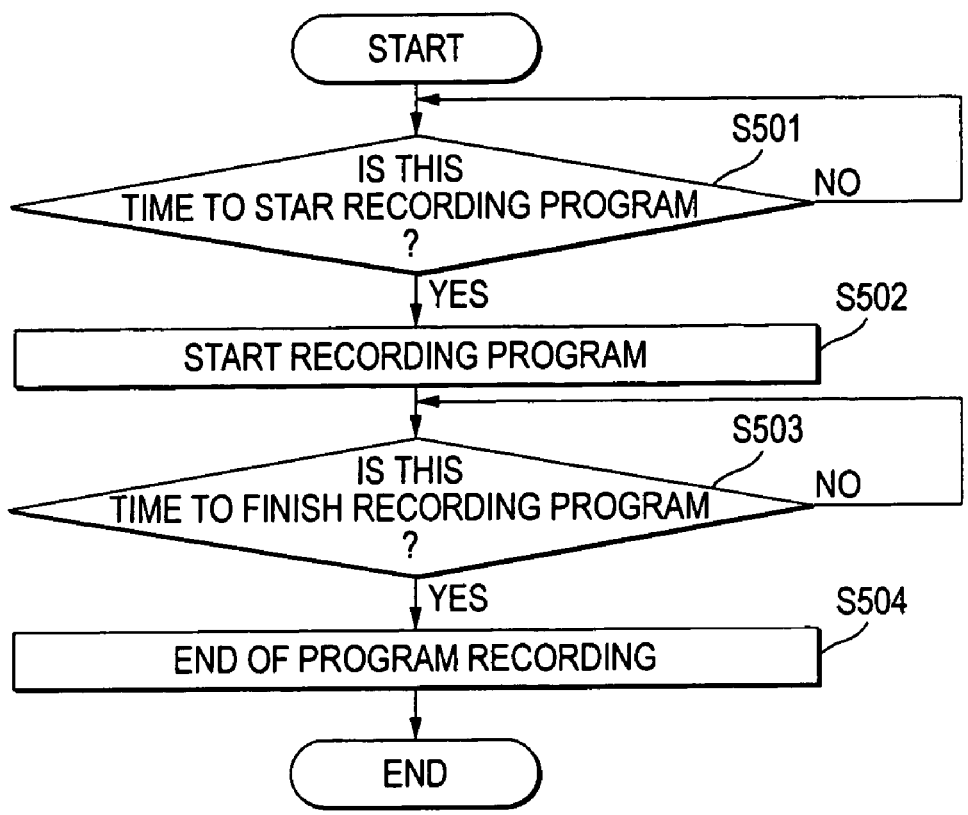
FIG. 8 is a flow chart for describing program recording processing performed in response to program recording reservation information transferred.

FIG. 8 is a flowchart for describing program recording processing performed by the reservation-making hard disk recorder in response to incoming program recording reservation information. As with the processing described with reference to FIG. 6, the processing shown in FIG. 8 is performed if the reservation-making hard disk recorder 1 is ready for program recording processing without performing playback processing. The processing is equally performed by the hard disk recorder 1 that has received a program recording request.

The control section 15 of the reservation-making hard disk recorder 1 compares program recording start time contained in program recording reservation information stored and held in its own EEPROM 154 and the like with the current time provided by the timer 19 and determines whether this is the program recording start time for a television program subjected to a program recording reservation (step S501).

When determining, in the determination processing at step S501, that this is not the program recording start time, the control section 15 repeats the processing at S501 and waits until the program recording start time. When determining, in the determination processing at step S501, that this is the program recording start time for the television program subjected to a program recording reservation, the control section 15 controls each part of the hard disk recorder 1 according to the program recording reservation information and starts recording the television program subjected to a program recording reservation (step S502).

The control section 15 then compares program recording end time contained in program recording reservation information stored and held in its own EEPROM 154 and the like with the current time provided by the timer 19 and determines whether this is the program recording end time for the television program subjected to the program recording reservation (step S503).

When determining, in the determination processing at step S503, that this is not the program recording start time, the control section 15 repeats the processing at step S503 while continuing the program recording processing and waits until the program recording end time. When determining, in the determination processing at step S503, that this is the program recording start time for the television program subjected to a program recording reservation, the control section 15 controls each part of the hard disk recorder and ends ongoing television program recording (step S504).

As described above, the processing shown in FIG. 8 is performed in complete the same way that it would be for a program recording reservation intended for the users own recording apparatus even if program recording processing is performed in response to the program recording reservation information provided by the reservation-receiving hard disk recorder. In other words, the reservation-making hard disk recorder records (stores and holds) the television program subjected to a program recording reservation in the hard disk 16 based on the program recording reservation information held in the EEPROM 154 of the users own recording apparatus. The reservation-making hard disk recorder then ends the program recording processing and waits for directions without automatic transfer.

This permits television program data subjected to a program recording reservation to be stored and held in the hard disk of the reservation-making hard disk recorder 1 even if a program is recorded in response to program recording reservation information provided by the reservation-receiving hard disk recorder 1.

(Processing for Requesting the Provision of a Television Program Obtained from the Program Recording Processing Performed Instead)

A description will be given below of processing performed by a recording-requesting hard disk recorder if the recording-requesting hard disk recorder receives the provision of television program data obtained through program recording processing performed instead by a reservation-making hard disk recorder based on program recording reservation information from the recording-requesting hard disk recorder, as described with reference to FIG. 6.

Figure 9:
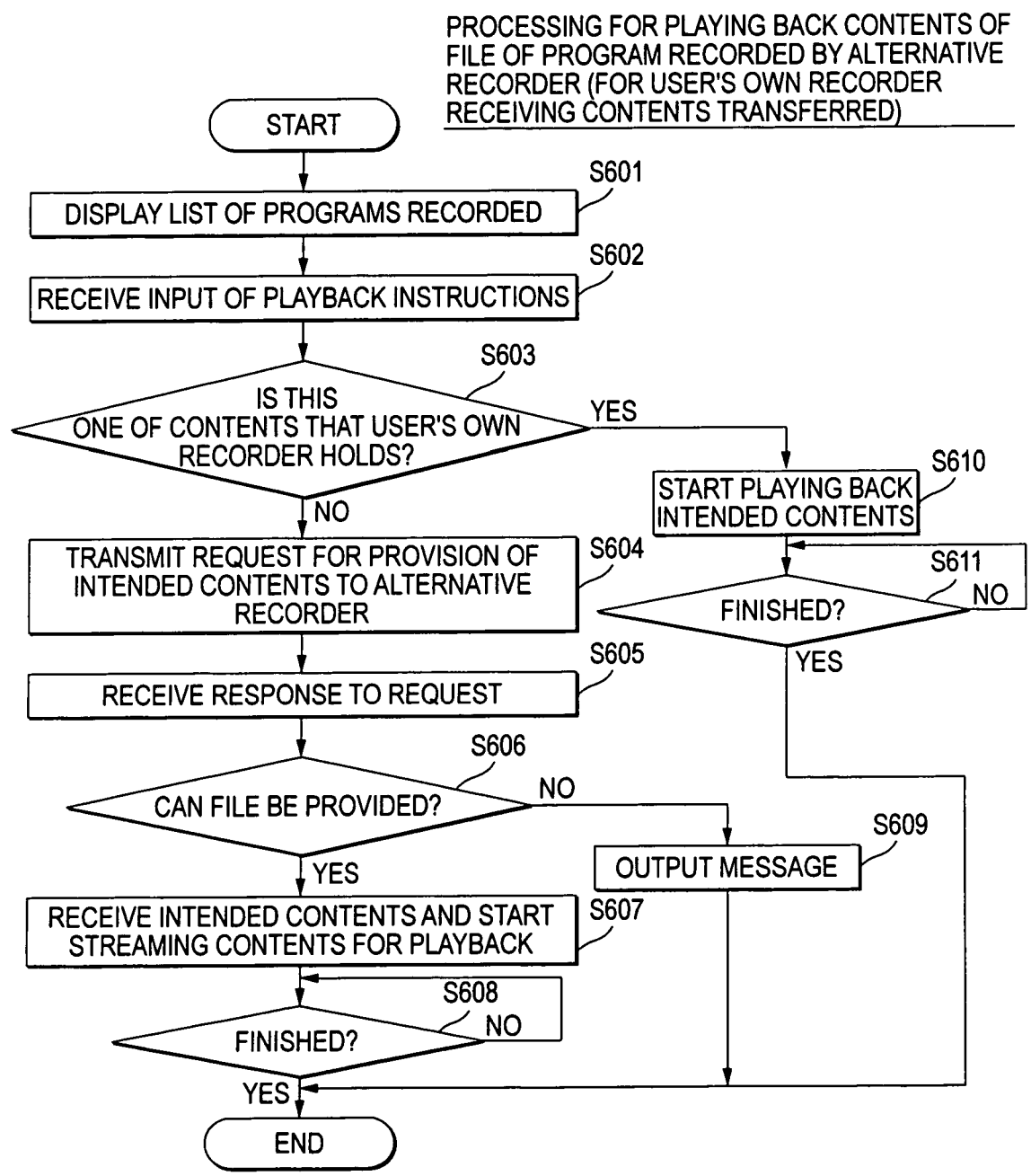
FIG. 9 is a flowchart for describing process performed in a hard disk recorder 1 of a recording-requesting recording apparatus.

FIG. 9 is a flow chart for describing processing by a recording-requesting hard disk recorder if a request is made for the provision of a television program obtained through program recording processing performed instead. The processing shown in FIG. 9 is a flow chart for describing playback processing performed if a predetermined operation is performed to play back contents stored and held in the hard disk 16.

To perform a predetermined operation for the playback of contents stored and held in the hard disk 16, the control section 15 creates a recorded program list, based on recorded program list data created in the EEPROM 154 or hard disk 16, for example. The control section 15 then feeds the recorded program list to video D/A section 141 of the D/A conversion section 14. The recorded program list is displayed on the display screen of the display terminal of the monitor receiver connected to the user's own recording apparatus (step S601).

In this case, the recorded program list data created in the EEPROM 154 or the hard disk 16 contains information stored and held in the hard disk 16 of the user's own recording apparatus and information about television programs (contents) stored and held in the hard disk recorder of another reservation-making recorder that recorded programs based on the program recording reservation information transferred from the user's own recording apparatus. The control section 15 is configured to be able to distinguish, understand, and notify their locations to the user as well.

The control section 15 then receives the inputs (including selection inputs) of directions for playing back intended contents from the user through the key operation section 20 or the remote control 22 (step S602). The control section 15 determines whether contents subject to playback directions are stored and held in the hard disk 16 of the user's own recording apparatus (step S603).

When determining, in the determination processing at step S603, that contents under playback request is not stored and held in the hard disk 16 of the user's own recording apparatus (stored and held in the hard disk of another recorder), the control section 15 transmits a provision request for the intended contents to another hard disk recorder holding the relevant contents through the LAN (step S604). The hard disk recorder to which the content provision request is transmitted is the reservation-making hard disk recorder that recorded the program that recorded programs based on the program recording reservation information transferred from the user's own recording apparatus.

The control section 15 then receives a response from the hard disk recorder to which the content provision request was transmitted (step S605). Based on the response received, the control section 15 then determines whether the provision of the content request is possible (step S606). If, in this case, the hard disk recorder having requested contents may provide the requested contents, the hard disk recorder having the requested contents return a response that the provision of the requested contents is possible, as also described later. If the requested contents is not present at the hard disk recorder that has received the provision request and its provision is not possible and if the provision of the requested contents is not possible because of other processings, for example, a response that the provision of the contents is not possible is returned. The control section 15 can make a judgement according to the response.

When determining, in the determination processing at step S606, that a response that the provision of the requested contents is possible has been received, the control section 15 receives the intended contents (television program data recorded instead, in this case) transmitted through the LAN and starts so-called streaming playback to play back the contents in sequence (step S607).

The control section 15 then determines whether events ending streaming playback has occurred, such as the completion of the reception or playback of all data for the intended contents and the reception of streaming playback stop directions (step S608) When determining that no such events have occurred, the control section 15 repeats the processing starting at step S608 and waits until an end event occurs. When determining, in the determination processing at step S608, that an end event has occurred, the control section 15 ends streaming playback and then the processing shown in FIG. 9.

When determining, in the determination processing at step S606, that a response that the provision of the requested contents is impossible has been received, the control section 15 outputs a notification message to that effect, based on the received response (step S609) and ends the processing shown in FIG. 9.

The processing at step S609 involves displaying a display message on the display screen of the display terminal of the monitor receiver through the video D/A section 141 of the D/A conversion section 14. The processing at step S609 also involves allowing warning tones and audio messages to be emitted from external loudspeakers through the audio D/A section 142 of the D/A conversion section 14. The step S609 processing may involve displaying a warning message on an LCD provided for hard disk recorder 1 or causing a warning LCD provided for the hard disk recorder 1 to turn on or blink. The above processing may also involve controlling an audio generator such as a hard disk recorder 1 buzzer to emit warning tones. Needless to say, the processing at step S609 may involve using a combination of these steps.

When determining, in the determination processing at step S603, that the contents under playback request is stored and held in the hard disk 16 of the user's own recording apparatus, the control section 15 also reads out the intended contents from the hard disk 16 of the user's own recording apparatus and starts playback processing (step S610).

The control section 15 then determines whether events ending content playback has occurred, such as the completion of the reception or playback of all data for the intended contents and the reception of playback stop directions (step S611). When determining that no such events have occurred, the control section 15 repeats the processing starting at step S611 and waits until an end event occurs. When determining, in the determination processing at step S611, that an end event has occurred, the control section 15 ends content playback and then the processing shown in FIG. 9.

In this way, the reservation-receiving hard disk recorder 1 receives the provision of television program data recorded instead from the reservation-making hard disk recorder through the LAN to allow the streaming playback of the television program data.

(Processing for Providing a Television Program Obtained from the Program Recording Processing Performed Instead)

A description will be given below of processing for providing a televised program recorded instead by a reservation-making hard disk recorder in response to incoming program recording reservation information, in response to a content provision request from a reservation-receiving hard disk recorder. FIG. 10 is a flow chart for describing processing performed by the reservation-making hard disk recorder for providing a broadcast program obtained from program recording processing performed instead to a reservation-requesting hard disk recorder.

Each of the hard disk recorders 1 connected to the LAN is ready to receive information transmitted to the user's own recording apparatus and waits until the information is received (step S701). When determining, in the determination processing at step S701, that information transmitted to the users own recording apparatus has been received, the control section 15 determines whether the received information that was transmitted to the users own recording apparatus is a content provision request (step S702).

When determining, in the determination processing at step S702, that a content provision request has been received, the control section 15 determines whether the contents under provision request is held and the user's own recording apparatus may provide the contents referring to the directory of the hard disk 16 of the user's own recording apparatus, or the like (step S703).

When determining, in the determination processing at step S703, that the provision of the requested contents is possible, the control section 15 forms a response to that effect and sends the response to the requesting hard disk recorder through the LAN I/F 17, the connection terminal 18, and the LAN (Step S704). The control section 15 then reads the contents under provision request from the hard disk 16 and starts transmitting the contents to the requesting hard disk recorder through the LAN I/F 17, the connection terminal 18, and the LAN (step S705).

The control section 15 then determines whether the transmission of all data for the requested contents is over (step S706). When determining that the transmission is not over, the control section 15 repeats the processing starting at step S706 and waits. When determining, in the determination processing at step S706, that the transmission of all data for the requested contents is over, the control section 15 also ends the processing shown in FIG. 10.

If, in the determination processing at step S703, the provision of the requested contents is not possible, for example, because the requested contents is not present in the hard disk 16 or because of other processings, the control section 15 forms a response that the provision is not possible. The control section 15 then transmits the response to the requesting hard disk recorder through the LAN I/F 17, the connection terminal 18, and the LAN (step S707) and ends the processing shown in FIG. 10.

When determining, in the determination processing at step S702, that the received information that was transmitted to the user's own recording apparatus is not a content provision request, other processings will also be performed in response to the received information (step S708).

As described above, in the examples described with reference to the flow charts in FIGS. 8, 9, and 10, data for the television program recorded instead is stored and held in the hard disk of the reservation-making hard disk recorder. The recording-requesting hard disk recorder receives the provision of recorded television program data from the recording-request receiving hard disk recorder so that the data may be utilized.

In other words, the recording-requesting hard disk recorder has an opportunity to utilize the hard disk of the recording-request receiving hard disk recorder in the same way as its own hard disk. This therefore helps to allow the effective use of the hard disk of a hard disk recorder not used often.

In examples described with reference to the flow chats in FIGS. 8, 9, and 10, an example of streaming playback has been described but is not limiting. The following steps may be used. In response to a request by the recording-requesting hard disk recorder, for example, the reservation-making hard disk recorder transfers television program data recorded instead to a relevant reservation-receiving hard disk recorder. The reservation-receiving hard disk recorder then receives, stores and holds the transferred television program data in the hard disk of the user's own recording apparatus. The reservation-making hard disk recorder then deletes the transferred television program data from its hard disk. Unlike the automatic transfer of television program data just recorded to a reservation-receiving hard disk recorder, a so-called move function is realized at appropriate timings at the user's convenience.

(Others)

When receiving program recording reservation information facing a at least partial broadcasting time period overlap, in the embodiment described above, a reservation-receiving recording apparatus makes an inquires to each of the other recording apparatuses connected to the same network in sequence. The inquiry is about whether it is possible to make a program recording reservation responsive to program recording reservation information having a overlap in the user's own recording apparatus. When receiving a response that such a program recording reservation is possible from another recording apparatus, the reservation-receiving recording apparatus regards another recording apparatus as a reservation-making recording apparatus. The reservation-receiving recording apparatus then transmits a program recording reservation request including program recording reservation information to the reservation-making recording apparatus. This is not a limiting example of this embodiment.

As a simple example, an inquiry may be made to all of the recording apparatuses connected to a network at one time about whether it is possible to make a program recording reservation responsive to program recording reservation information having a overlap in the user's own recording apparatus. From among some recording apparatuses returning a response that the program recording reservation is possible, the reservation-receiving recording apparatus may select as a reservation-making recording apparatus as recording apparatus to which a program recording reservation request including program recording reservation information will be transmitted. A decision may be made about which method is to be used based on the number of recording apparatuses connected to a network and their communications capacity.

In the embodiment described above, program recording reservation information inputted later is transferred, which may result in at least a partial broadcasting time period overlap. This is not a limiting example. Program recording reservation information registered earlier may also be transmitted before a program is recorded in response to later inputted program recording reservation information by the user's own recording apparatus.

In addition, program recording reservation information including an overlap-free portion may be transferred to a reservation-making recording apparatus. The reservation-making recording apparatus may then record one of the television programs specified by the program recording reservation information instead. Another reservation-making recording apparatus also may record only the portion of a program that faces a time period overlap. After program recording, the reservation-receiving recording apparatus then receives the recorded portion of the program from the reservation-making recording apparatus for combination purposes.

User information for hard disk recorder may also be registered in a relevant hard disk recorder and priority may be set for each user. It is also possible to receive program recording reservations according to the priority if program recording reservations are made. For a user with a high priority, a program recording reservations may be made later, for example. If there is an overlap between program recording reservations for a high-priority user and for a low-priority user, it will be possible, for example, to transfer a program recording reservation for the low-priority user to another hard disk recorder.

In the above-mentioned embodiment, a description has been given of hard disk recorders (recording apparatus) that include functions for receiving analog television programs and selecting channels. This embodiment may also be applicable to recording apparatuses that receive radio broadcast and recording apparatuses that receive digital broadcast. The embodiment of the present invention is also applicable to recording apparatuses connected to cable television broadcast network. In these cases, the hard disk recorders employed would be different in the configuration of only portions for receiving programs and selecting channels, but not very different in the configuration of the remaining portions.

Contents for which a program recording reservation is possible include contents provided through ground-based broadcasting signals, contents provided through AM and FM radio broadcast, contents provided through satellite broadcast, contents provided through wired media such as cable television broadcast, and contents through wide area networks. It is possible to use this embodiment of the present invention if reservations for content recording such as program recording reservations for various contents are handled.

In the above-mentioned embodiment, examples using hard disk recorders have been described but the embodiment is not limited to these examples. This embodiment is applicable if recording apparatuses and recording playback apparatuses that use optical disks as recording media such as DVDs (Digital Versatile Dscs), recording apparatuses and recording playback apparatuses that use megneto-optical disks as recording media such as MDs (Mini Disks (registered trademark)), and recording apparatuses and recording playback apparatuses that use magnetic tapes as recording media are used. In other words, this embodiment of the present invention is also applicable to systems composed of a plurality of types of recording apparatuses and recording playback apparatuses, such as systems formed by hard disk recorders, DVD recorders, and VTRs.

It should be understood by those skilled in the art that various modifications, combinations, sub-combinations and alternations may occur depending on design requirements and other factors insofar as they are within the scope of the appended claims or the equivalents thereof.

The invention claimed is:

1. A recording system having a plurality of recording apparatuses connected to a network, the plurality of apparatuses comprising:
    a function for selecting a channel for receiving a broadcasting signal; and
    a recording reservation function for recording, in individual recording media, program information defining a broadcast program that is broadcast through an intended broadcasting channel at a predetermined time of day;
    wherein the plurality of apparatuses includes a reservation-receiving recording apparatus comprising
    reception means for receiving recording reservation information from a user,
    a memory for storing said recording reservation information received through said reception means,
    detection means for detecting any overlapping portion of a broadcasting time period using said recording reservation information received through said reception means and said recording reservation information stored in said memory, and
    delivery means for forming and delivering to said network for supply to another one or ones of said recording apparatuses a recording reservation request including overlapping recording reservation information if said detection means detects at least a portion of the broadcasting time period overlaps, in which the recording reservation request inquires as to whether a respective one or ones of the other said recording apparatuses are able to receive the overlapping recording reservation information so as to enable corresponding recording to be performed thereat; and
    wherein the plurality of apparatuses further includes a reservation-making recording apparatus comprising
    a memory for holding recording reservation information,
    reception means for receiving information transmitted through said network,
    determination means for checking said recording reservation information in said memory and determining whether the information received through said reception means is receivable if the information received through said reception means is a recording reservation request by said reservation-receiving recording apparatus,
    reservation request reception means for storing in said memory recording reservation information responsive to said recording reservation request if said determination means determines that said recording reservation is receivable,
    reservation recording control means for controlling a recording of program information defining a broadcast program provided by broadcasting in said recording medium in response to said recording reservation information stored in said memory through said reservation request reception means, and a control device which determines if the program information defining said broadcast program recorded in said recording medium should be transferred, and when a result thereof indicates that the program information should be transferred, (i) transfers the program information defining said broadcast program recorded in said recording medium to the reservation-receiving recording apparatus and (ii) after completion thereof deletes the program information recorded in said recording medium from said recording medium.

2. A recording system having a plurality of recording apparatuses connected to a network, the plurality of apparatuses comprising:

a function for selecting a channel for receiving a broadcasting signal; and a recording reservation function for recording, in individual recording media, program information defining a broadcast program that is broadcast through an intended broadcasting channel at a predetermined time of day;

wherein the plurality of apparatuses includes a reservation-receiving recording apparatus comprising reception means for receiving recording reservation information from a user, a memory for storing said recording reservation information received through said reception means, detection means for detecting any overlapping portion of a broadcasting time period using said recording reservation information received through said reception means and said recording reservation information stored in said memory, and delivery means for forming and delivering to said network a recording reservation request including overlapping recording reservation information if said detection means detects at least an portion of the broadcasting time period overlaps; and wherein the plurality of apparatuses further includes a reservation-making recording apparatus comprising a memory for holding recording reservation information, reception means for receiving information transmitted through said network, determination means for checking said recording reservation information in said memory and determining whether the information received through said reception means is receivable if the information received through said reception means is a recording reservation request by said reservation-receiving recording apparatus, reservation request reception means for storing in said memory recording reservation information responsive to said recording reservation request if said determination means determines that said recording reservation is receivable, and reservation recording control means for controlling a recording of program information defining a broadcast program provided by broadcasting in said recording medium in response to said recording reservation information stored in said memory through said reservation request reception means, wherein said reservation-receiving recording apparatus further comprises reception means for receiving program information defining broadcast program transmitted through said network, recording processing means for recording program information defining said broadcast program received through said reception means in said recording medium of a user's own recording apparatus, and program information transmission means for transmitting the program information defining said broadcast program recorded in said recording medium to a recording apparatus providing said recording reservation information, in response to control by said reservation recording control means, if recording in the user's own apparatus program information defining a broadcast program by means of a broadcasting signal for reception and channel selection comes to an end.

3. A recording system according to claim 1, wherein said reservation-receiving recording apparatus further comprises provision request transmission means for transmitting a provision request for program information defining recorded Broadcast program to a reservation-making unit that has performed recording in response to a recording reservation request through said network; and reception means for receiving program information defining broadcast program transmitted to a user's own recording apparatus through said network.

4. A recording method used in a recording system having a plurality of recording apparatuses connected to a network including a reservation-receiving recording apparatus and a reservation-making recording apparatus, the plurality of apparatuses including a function for selecting a channel for receiving a broadcasting signal and a recording reservation function for recording in individual recording media program information defining a broadcast program broadcast through an intended broadcasting channel at a predetermined time of the day, said method comprising:

in the reservation-receiving recording apparatus, receiving recording reservation information from a user;

storing said recording reservation information received in a predetermined memory;

detecting any overlapping portion of a broadcasting time period using said recording reservation information received and said recording reservation information stored in said memory; and forming and delivering to said network for supply to another one or ones of said recording apparatuses a recording reservation request including overlapping recording reservation information if said detecting detects at least that an overlapping portion of the broadcasting time period exists, in which the recording reservation request inquires as to whether a respective one or ones of the other said recording apparatuses are able to receive the overlapping recording reservation information so as to enable corresponding recording to be performed thereat; and in the reservation-making recording apparatus, receiving information transmitted through said network;

checking said recording reservation information in a memory holding recording reservation information and determining whether the information received is receivable if the information received is a recording reservation request by said reservation-receiving recording apparatus;

storing in said memory recording reservation information responsive to said recording reservation request if said recording reservation is determined to be receivable;

controlling a recording of program information defining a broadcast program provided by broadcasting in said recording medium in response to said recording reservation information stored in said memory, and determining by use of a control device if the program information defining said broadcast program recorded in said recording medium should be transferred, and when a result thereof indicates that the program information should be transferred, (i) transferring the program information defining said broadcast program recorded in said recording medium to the reservation-receiving recording apparatus and (ii) after completion thereof deleting the program information recorded in said recording medium from said recording medium, by use of the control device.

5. A recording method used in a recording system having a plurality of recording apparatuses connected to a network including a reservation-receiving recording apparatus and a reservation-making recording apparatus, the plurality of apparatuses including a function for selecting a channel for receiving a broadcasting signal and a recording reservation function for recording in individual recording media program information defining a broadcast program broadcast through an intended broadcasting channel at a predetermined time of the day, said method comprising:

in the reservation-receiving recording apparatus, receiving recording reservation information from a user;

storing said recording reservation information received in a predetermined memory;

detecting any overlapping portion of a broadcasting time period using said recording reservation information received and said recording reservation information stored in said memory; and forming and delivering to said network a recording reservation request including overlapping recording reservation information if said detection means detects at least that an overlapping portion of the broadcasting time period exists; and in the reservation-making recording apparatus, receiving information transmitted through said network;

checking said recording reservation information in a memory holding recording reservation information and determining whether the information received is receivable if the information received is a recording reservation request by said reservation-receiving recording apparatus;

storing in said memory recording reservation information responsive to said recording reservation request if said recording reservation is determined to be receivable; and controlling a recording of program information defining a broadcast program provided by broadcasting in said recording medium in response to said recording reservation information stored in said memory, and said method further comprising:

in the reservation-receiving recording apparatus, receiving program information defining broadcast program transmitted through said network; and recording program information defining said broadcast program received in said recording medium of a user's own recording apparatus; and in the reservation-making recording apparatus, transmitting the program information defining said broadcast program recorded in said recording medium to a recording apparatus providing said recording reservation information if recording of program information defining a broadcast program by means of a broadcasting signal for reception and channel selection comes to an end.

6. A recording method according to claim 4, further comprising:

in the reservation-receiving recording apparatus, transmitting a provision request for program information defining recorded broadcast program to a reservation-making unit that has performed recording in response to a recording reservation, request through said network; and receiving program information defining broadcast program transmitted through said network so that the program information may be utilized.

7. A recording apparatus having a plurality of recording apparatuses adapted to be connectable to a network, the plurality of apparatuses including function for selecting a channel for receiving a broadcasting signal and a recording reservation function for recording in a recording medium of a user's own recording apparatus program information defining a broadcast program broadcast through an intended broadcasting channel at a predetermined time of the day, said recording apparatus comprising:

a memory for holding recording reservation information;

reception means for receiving information transmitted through said network;

determination means for checking said recording reservation information in said memory and determining whether the information received through said reception means is receivable if the information received through said reception means is a recording reservation request from another recording apparatus;

reservation request reception means for storing in said memory recording reservation information responsive to said recording reservation request if said determination means determines that said recording reservation is receivable; and reservation recording control means for controlling a recording of program information defining a broadcast program provided by broadcasting in said recording medium in response to said recording reservation information stored in said memory through said reservation request reception means, said recording apparatus further comprising:

program information transmission means for transmitting the program information defining said broadcast program recorded in said recording medium to a recording apparatus providing said recording reservation information, in response to control by said reservation recording control means, if recording in the user's own apparatus program information defining a broadcast program by means of a broadcasting signal for reception and channel selection comes to an end.

* * * * *